(12) United States Patent
Candiotti

(10) Patent No.: US 11,900,422 B1
(45) Date of Patent: Feb. 13, 2024

(54) METHOD AND SYSTEM FOR SUPPORTING A REAL-TIME AUCTION OF DIGITAL ADVERTISING IN ONLINE MEDIA USING AN EMBEDDED SCRIPT

(71) Applicant: Optimera, LLC, Brooklyn, NY (US)

(72) Inventor: Keith Candiotti, Brooklyn, NY (US)

(73) Assignee: Optimera, LLC, Brooklyn, NY (US)

( * ) Notice: Subject to any disclaimer, the term of this patent is extended or adjusted under 35 U.S.C. 154(b) by 0 days.

(21) Appl. No.: 18/161,552

(22) Filed: Jan. 30, 2023

Related U.S. Application Data

(60) Provisional application No. 63/267,308, filed on Jan. 31, 2022.

(51) Int. Cl.
*G06Q 30/0273* (2023.01)

(52) U.S. Cl.
CPC ................ *G06Q 30/0275* (2013.01)

(58) Field of Classification Search
None
See application file for complete search history.

(56) References Cited

U.S. PATENT DOCUMENTS

| | | | | |
|---|---|---|---|---|
| 10,565,626 | B2 * | 2/2020 | Seljan | G06Q 30/0275 |
| 10,664,867 | B2 | 5/2020 | Candiotti | |
| 11,410,203 | B1 * | 8/2022 | Haque | G06Q 30/016 |
| 2010/0114676 | A1 * | 5/2010 | Kemper | G06Q 30/0207 |
| | | | | 705/14.1 |
| 2011/0231264 | A1 * | 9/2011 | Dilling | G06Q 30/0275 |
| | | | | 705/14.71 |
| 2011/0313857 | A1 * | 12/2011 | Nice | G06Q 30/02 |
| | | | | 705/14.66 |
| 2017/0091829 | A1 * | 3/2017 | Siegler | G06Q 30/0277 |
| 2018/0040032 | A1 * | 2/2018 | Chalasani | G06Q 30/0243 |
| 2020/0219143 | A1 * | 7/2020 | Mak | G06Q 30/0275 |
| 2020/0364755 | A1 * | 11/2020 | Ferris | G06Q 30/0276 |
| 2021/0174389 | A1 * | 6/2021 | Barajas Zamora | |
| | | | | G06Q 30/0246 |
| 2021/0295374 | A1 * | 9/2021 | Liu | G06Q 30/0244 |
| 2022/0374944 | A1 * | 11/2022 | Newnham | G06Q 30/0277 |
| 2023/0222539 | A1 * | 7/2023 | Buchalter | G06Q 30/0246 |
| | | | | 705/14.41 |

OTHER PUBLICATIONS

Johnson et al. "Ghost Ads: Improving the Economics of Measuring Online Ad Effectiveness." Journal of Marketing Research, 54(6), 867-884. 2017. (Year: 2017).*

* cited by examiner

*Primary Examiner* — Christopher B Tokarczyk
(74) *Attorney, Agent, or Firm* — Fox Rothschild LLP

(57) ABSTRACT

Methods and systems for automatically determining an auction floor value for an ad insertion field of a user interface that presents digital content are disclosed.

19 Claims, 7 Drawing Sheets

METHOD AND SYSTEM FOR SUPPORTING A REAL-TIME AUCTION OF DIGITAL ADVERTISING IN ONLINE MEDIA USING AN EMBEDDED SCRIPT

RELATED APPLICATIONS AND CLAIM OF PRIORITY

This patent application claims priority to U.S. provisional patent application No. 63/267,308, filed Jan. 31, 2022, the disclosure of which is fully incorporated into this document by reference.

BACKGROUND

Digital content creators (for example: publishers, organizations, companies, and individuals) often monetize their content with digital advertisements. The more digital content and or audience a creator has, the more advertising inventory the creator has available to fill. Filling the available ad inventory with paying advertisements earns money for content creators. There are generally two ways for a content creator to fill the ad inventory: selling directly to advertisers; or giving inventory to one or more resellers to sell the ad inventory on their behalf.

Resellers are often referred to as Ad Networks, Open Exchanges, or Programmatic Buyers. When an ad is needed to fill unsold inventory, these entities bid for each piece of ad inventory by running an auction. For example, when someone visits a website, an Ad Network working with the website publisher, runs an auction to fill one or many of the ad positions on the webpage. Once the auction is done, the winning ad is either displayed on the page or submitted to the publisher's advertising platform for further consideration. This process generally happens every web page visit and generally occurs within 200 milliseconds.

The industry standard auction mechanic is called a First Price Auction. This means that when an Ad Network runs an auction, many advertisers may bid on the inventory but only the advertiser that bids the highest price wins the auction.

Often, a content creator signs up for multiple Ad Networks. This means that one auction occurs for each Ad Network. After a winner from each Ad Network is selected, these "Bids" are submitted to the content creator's Advertising Platform. There, the Advertising Platform may run its own auction (because Ad Networks sometimes tie directly into the Ad Platform), decide which Ad Network placed the highest bid (and is therefore the winner), and check to see if a directly sold ad, if present, should have higher priority and be delivered instead of the winning Ad Network bid.

The auctions and resulting bids from an Ad Network auction are usually expressed as a CPM (cost per mille [thousand] advertising impressions) in the publisher's native currency. For example, Advertiser A bids a $1.00 CPM for a chance to fill ad inventory that is up for auction. If Advertiser A is the winner and the ad is displayed, the advertiser pays the content creator $1.00/1000=$0.001.

Generally, Ad Networks try to optimize for the lowest possible CPM in order to give their advertisers the cheapest access to inventory when compared to results from other Ad Networks. Therefore, there is inherent downward pressure on bid CPMs. However, due to the limited supply of ad inventory, scarcity naturally pushes up the CPM. Therefore, a given set of digital advertising inventory will reach an equilibrium specific to its seasonality. In other words, there are market forces that cause CPMs to go up and down at the same time.

In order to optimize the yield of their inventory, content creators often create a CPM floor to prevent the CPM from falling below a certain threshold. The floor is a force that can create value for the content creator. Generally, a floor can be created in the Ad Platform or Ad Network user interfaces as a rule attached to a specific set of inventory. For example, a rule can be created in the Ad Platform that creates a CPM floor of $1.00 for all website visitors who live in the United States. This means that if the specific or culmination of auction winner(s) all bid less than a $1.00 CPM for a given ad opportunity, no participant is allowed to win. In which case, a possible outcome is that no ad serves and the ad inventory goes non-monetized. However, over time, the Ad Networks may learn that they never win for less than a $1.00 CPM bid and will therefore increase their bid/s to greater than $1.00 in order to win.

The above example illustrates that adding pricing floors to automated digital advertisement auctions can yield higher revenue; however, if a floor is set too high it can cause a loss in total revenue. Therefore, it is important to set appropriate floors against the inventory. This can be a challenge from both a technical and a practical standpoint. Usually, the process for creating a floor requires the manual labor of going into an ad network user interface and configuring the floor as an automated rule, implemented in the Ad Network systems. Often, this means repeating the same floor rules in multiple Ad Network user interfaces to prevent a "back door" Ad Network that has no floors applied, from bidding on the inventory. Most interfaces only allow a certain number of rules/floors to be applied. All Ad Network interfaces lack granularity specific to an exact piece of ad inventory on an exact piece of content. Therefore, an inherent flaw in flooring is that a general rule must be placed across a vast amount of inventory (such as all U.S. Traffic has a $1 CPM floor even though some sub-geolocations [i.e., New York City or Washington D.C.] might naturally have higher CPMs than others). The rule must be simultaneously and instantaneously deployed by a large number of disparate systems, each of which may have different conditions or limitations before the systems will accept the rule.

This document describes methods and systems that are directed to addressing the problems described above, and/or other issues.

SUMMARY

Methods, systems, and computer program products for automatically determining an auction floor value for an ad insertion field of a user interface that presents digital content are disclosed.

In a first embodiment, an electronic device displays a page comprising digital content, wherein the page includes an ad insertion field and a measurement script. A measurement script is a line of code that is part of a webpage and that, when it executes, will measure certain parameters of usage of the page and/or detect other items, and it will generate and send a message to an external server to report the measured parameters or detected items. A processor will receive an indication that the electronic device is displaying the page and the ad insertion field. The processor will identify an auction floor value that is associated with the ad insertion field. Using the auction floor value, the processor will generate and submit to an advertising platform a phantom bid to insert content into the ad insertion field, wherein the phantom bid includes a tag that identifies the phantom bid as the phantom bid. After an advertisement has been displayed in the ad insertion field, the measurement script will send to the processor a data attribute for the ad insertion field, wherein the data attribute indicates whether the advertisement being displayed in the ad insertion field includes the content from the phantom bid. If the advertisement being displayed includes the content from the phantom bid, the processor will generate a signal to adjust the auction floor value downward; otherwise the processor will not generate such a signal. For example, if the advertisement being displayed does not include the content from the phantom bid, the processor may generate a signal to adjust the floor value upward, or it may leave the floor value unchanged.

Before identifying the auction floor value, the processor may receive, from the measurement script, parameters associated with the electronic device or a user of the electronic device. The parameters will comprise at least some of the following: page host, page identifier, uniform reference locator of the page, device operating system, browser, position of the ad insertion field on the page, and/or size of the ad insertion field. Identifying the auction floor value may include querying the data store to return a floor value that is associated with the received parameters, and then using the floor value that is returned from the data store as the auction floor value.

Optionally, a processor that executes the measurement script may: (i) send the auction floor value to the advertising platform along with an invitation to bid on the ad insertion field; (ii) receive the advertisement from the advertising platform in response to the invitation to bid; and (iii) cause the ad insertion field to display the advertisement.

The measurement script may be associated with the page in any number of ways. For example, the measurement script may be embedded in a footer of the page, embedded in a header of the page, or associated with a tag on the page that calls the measurement script when the ad insertion field is being displayed.

In a second embodiment, an electronic device displays a page comprising digital content and an ad insertion field. A processor receives an indication that the electronic device is displaying the page and the ad insertion field. The processor identifies an auction floor value that is associated with the ad insertion field. Using the auction floor value, the processor generates and submits to an advertising platform a phantom bid to insert content into the ad insertion field, wherein the phantom bid includes a tag that identifies the phantom bid as the phantom bid. After an advertisement has been displayed in the ad insertion field, the processor executes a measurement script that examines the ad insertion field and a data attribute for the ad insertion field, wherein the data attribute indicates whether the advertisement being displayed in the ad insertion field includes the content from the phantom bid. If the advertisement being displayed includes the content from the phantom bid, the processor generates a signal to adjust the auction floor value downward; otherwise it will not generate the signal to adjust the auction floor value downward. For example, if the advertisement being displayed does not include the content from the phantom bid, the processor may generate a signal to adjust the floor value upward, or it may leave the floor value unchanged.

Optionally, to identify the auction floor value the processor may query the data store to return a floor value that is associated with an identifier of the page. The processor may then use the floor value that is returned from the data store as the auction floor value.

Optionally, the processor may: (i) send the auction floor value to the advertising platform along with an invitation to bid on the ad insertion field; (ii) receive the advertisement from the advertising platform in response to the invitation to bid; and (iii) cause the ad insertion field to display the advertisement.

DETAILED DESCRIPTION

Figure 1:
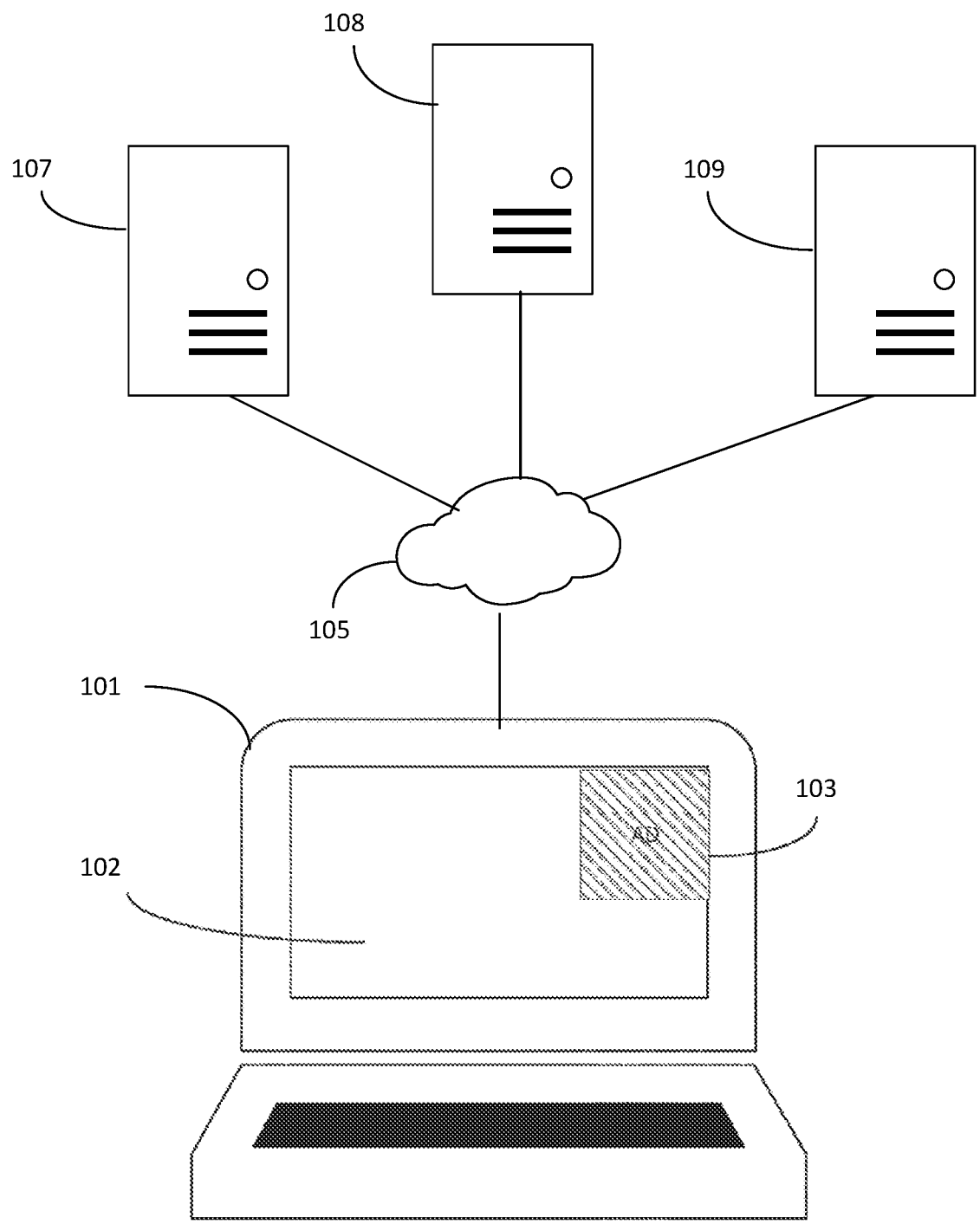
FIG. 1 illustrates an example of an electronic device displaying a page with an ad insertion field.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to."

In this document, when terms such as "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

This document uses the terms "page", "webpage" and "site" for ease of explanation when describing a platform that uses the disclosed solutions. However, the solution can be deployed on any digital content publication structure, including but not limited to websites, native and/or specific applications, or other digital service platforms on which digital content is output to viewers via a user interface. Thus, the term "page" refers to any page, screen or other output from of a digital publication, and the term "site" refers to website, an installed application, or the like.

Additional terms that are relevant to this disclosure will be defined at the end of this Detailed Description section.

This patent document describes methods, systems, and computer program products that enable digital content producers to maintain a dynamic, granular, real time and self-adjusting auction price floor across all digital advertising inventory. The disclosed solutions use an embedded script in the web page or other digital structure that publishes the digital content.

Embodiments of this disclosure seek to solve the current limitations by utilizing real-time and granular data to create dynamic price floors for each segmentation that can be identified. By automatically creating a floor for each combination of inventory segments that are available to the system and adjusting the floor based on detecting if the floor CPM (cost per mille [thousand] impressions) wins or loses a given ad request, an optimal floor price will be discovered, automatically deployed via an embedded script, and applied to each discrete piece of ad inventory thus yielding the most optimal revenue result.

It is desirable that a flooring system would be able to set a price floor on a specific piece of ad inventory to extract the most value from it. To illustrate this, imagine a news website that has thousands of individual web pages or pieces of content. The content and how it is accessed can be segmented in many ways, including these few, following examples: (1) Types of visiting devices (such as desktop, mobile, tablet, smart television, virtual reality headset); (2) Types of visiting web browsers (such as Chrome, Firefox, Edge); (3) Types of visiting operating systems (such as iOS, Android, Windows); (4) Time of day of visit (such as Morning, Noon, Night); (5) Audience category (such as Men, Women, and/or over 40 years of age); (6) Page Content (such as News Article, Sports Gallery, Homepage); and/or (7) Position of Ad (such as Top, Middle, Bottom of page/user interface).

With just the above segmentations, a digital advertisement auction system could exponentially calculate over 3,000 ideal price floors for a single article. In reality, there could be hundreds of thousands of ideal floors which current technologies and workflows simply cannot handle efficiently.

Embodiments of this disclosure include a series of events. The disclosure discusses embodiments in which content is provided by a website. However, the methods and systems of this document may be used with other processes to fill ad inventory in systems that interconnect ad networks, ad technology vendors and ad services. This same system will work whenever a digital ad auction takes place, whether on mobile applications, connected/smart TV, digital billboards, and/or metaverse/augmented reality to name a few.

FIG. 1 illustrates an example electronic device 101 displaying a page 102 with an ad insertion field 103 into which ad inventory may be placed. The electronic device 101 is in communication one or more external computing devices, such as a digital content server 107 and a digital advertisement server 108 via one or more communication networks 105. The electronic device 101 also may be in communication with a solution server 109 that implements one or more aspects of the solutions described in this document, such as a measurement script as will be described below. Each server 107-109 may be a single server or a distributed set of multiple servers that collectively perform various functions of the processes described below.

Data Collection

First, the system will be made aware of the content where the ad inventory exists. This is made possible by a measurement script that executes code in response to each ad request. The measurement script may be hosted on a publicly available server, accessed via a network request to the solution's server. Alternatively, content creators can host this script on their own web servers. The measurement script may capture the webpage address of the site on which the ad inventory will be deployed, dimensions of the ad position, device the site visitor is using, web browser or other application the site visitor is using to access the site, operating system the site visitor's user electronic device is using, geolocation of the site visitor, the ad position (as defined by the content's markup), keywords on the content, semantic data about the content, viewability of the ad position, time of day, audience data, or any other generally available and practical data to acquire. These data points are not proprietary to the measurement script but instead are publicly available data points shared in the moment by either the content's publisher, their vendors, or via an application programming interface (API) from such things as web browsers or client devices.

The measurement script also detects the result of an auction floor value. For ease of explanation, that description will come later in the narrative.

After acquiring data from the current event, in this case an electronic device 101 that is loading up a webpage 102 that has made a request for ads to an ad network server 109 via a header bidder, server side bidder, ad network, or ad platform, the measurement script will send any data acquired back to the solution's server 109 or other processor. An abbreviated example of the data, in pseudo code, follows:

Data Object:
   Host: www.example.com
   Path: Path: /Homepage
   Ad Position ID1: Top Leaderboard
   Size of Ad Position ID1: 970×250
   Ad Position ID2: Bottom Leaderboard
   Size of Ad Position ID2: 728×90
   Browser: Chrome
   Operating System: Windows
Data Processing The solution's server 108 will parse the above data into a structure that is friendly for analysis and store it. An example of such a structure is a database with each row representing a unique combination of data points. In a solution that employs such a structure, the first time that the solution is used may include a first data entry into the database resulting from the Data Object example from above such as the following:

| ID |
| --- |
| www.example.com\|/homepage\|Top Leaderboard\|970x250\|12:00\|Chrome\|Windows |
| www.example.com\|/homepage\|Bottom Leaderboard\|728x90\|12:00\|Chrome\|Windows |

Next, since there are two new IDs in the database, an arbitrary and configurable default value would be assigned to it. Let us assume the default value is $0.10 CPM. Resulting in:

| ID | Value |
| --- | --- |
| www.example.com\|/homepage\|Top Leaderboard\|970x250\|12:00\|Chrome\|Windows | 0.10 |
| www.example.com\|/homepage\|Bottom Leaderboard\|728x90\|12:00\|Chrome\|Windows | 0.10 |

Finally, an incrementing counter of how many times this configuration of data has been recorded as "i".

| ID | Value | 1 |
|---|---|---|
| www.example.com1/homepage1Top Leaderboard1970x250112:001Chrome1Windows | 0.10 | 1 |
| www.example.com1/homepage1Bottom Leaderboard1728x90112:001Chrome1Windows | 0.10 | 1 |

Once the data has been stored, this data will be made available for request from the website that is using the solution for future data requests. This request could be made directly to the database, an intermediary service such as an API or as a file. The file method is presented below simply for illustration.

The data can be broken down into levels of specificity. The broadest view of the data could be all data that is from "example.com". The second level of abstraction is "homepage". The third level is the ad position but since many ad positions can be on one page it is best to group all ad positions under their parent page and domain. As such, the solution can output an auction floor file such as one named "www.example.com/homepage.floordatafile". The file may contain data object tree such as the following:

Top Leaderboard
970x250
Chrome
Windows
$0.10
Bottom Leaderboard
728x90
Chrome
Windows
$0.10

This file would then be placed on a server that is publicly available to other users of the solution (such as solution server 109) so that the next visitor to the same webpage initiates a fetch for the file by the solution's processor.

Data Fetching & Price Floor Assignment

When the digital content, in this example the webpage "www.example.com/homepage", is accessed again in the future by the same or different user, the solution's script (e.g., code loaded for execution with the content) will attempt to fetch the data. In the example of a data file, a query goes out to the solution's server to see if a data file for this page exists. If one does, it will be returned to the page and the data will be parsed so that it is globally available for any other code running on the page to use it. The data will be the most useful if it matches the current page visitor's parameters. Let us assume that a second visitor to the page is also accessing the site from a Windows device using a Chrome browser. In this case, the floor price of $0.10 for the top and bottom leaderboard positions will be considered.

The primary use case of the floor price is to push this information into the content creator's Ad Platform and or Ad Network to set a minimum price for each of the specific ad positions on this domain, webpage, size, operating system, and browser combination. Currently, the industry standard way to pass this data into the Ad Platform or Ad Network is to utilize a key value pair. The key value pair can be injected into the Ad Platform or Ad Network ad request so that it has the additional floor data to consider when running its auction or advertisement selection process. However, the floor price could also be passed via an API or Server to Server.

To illustrate this, assume that example.com is using an Ad Network and an Ad Platform. When a user visits example.com/homepage, the user's electronic device makes a request to the solution's server and content server. The content server returns the page content and the example-.com/homepage data file is returned by the solution server. Assume that the user has parameters that match parameters in the data file (as explained earlier) resulting in a floor price of $0.10. This value is presented to the page code as a globally accessible variable. Next, the page code triggers the Ad Network code in order to run an auction and to pass in the Solution's floor price of $0.10. Therefore, the Ad Network, when running its auction, will consider this price floor which should result in either no advertiser winning or an advertiser winning in excess of $0.10. Assuming the latter, a bid is returned by the Ad Network to the page of $0.11 CPM. Next, the page code triggers the Ad Platform code which then ingests the Solution floor of $0.10 and the Ad Network bid of $0.11. The Ad Platform will now go through its ad selection process and consider both the Solution Floor and the Ad Network Bid. Assume that there is no other competition so the result is that Ad Network wins the right to serve its ad for the given ad position.

The process described above is an example. Other aspects of the solution may be used not only websites but also for other digital ad delivery systems such as mobile applications, digital video, digital video streaming, digital audio streaming, virtual reality, augmented reality, digital billboards (like expressway billboards), native advertising, and/or affiliate advertising. The solution may be used with a single Ad Network or with multiple Ad Networks implemented on the content. Operation of the solution may be triggered by a user request, or it may occur automatically such as when an ad insertion field is loaded onto a displayed page.

A data file is just one example of how the system may pass data to the page. Other methods by which the system may pass to a page include an application programming interface (API), database, or server to server request. The data file can match some or all parameters in order to satisfy passing a floor price to the page code. The floor can be a CPM or another pricing metric that will have an effect on the minimum value of the content and ad position. Floors can include: Cost Per Click, Cost Per Acquisition, or Revenue Per Mille, to name a few. The floor data can be returned as a global or private variable depending on how the implementer of the solution chooses. The order of events may change depending on when the floor data is most useful to be accessed. The floor data may or may not be passed into Ad Network(s). The floor data may or may not be passed into the Ad Platform(s).

Regardless of the options selected above, the solution will fetch the appropriate data to be given to other services where the price floor creates value during the current session and advertising technology auction process.

Price Floor Adjustment

Once the price floor has been retrieved and forwarded into other ad systems, the system may assess whether the price floor resulted in a positive, neutral, or negative outcome. This is a dynamic component of the price floor solution. In order to determine an outcome, the price floor will be compared to the result of the ad selection process outcome. In other words, once all of the ad technology on the content has displayed an advertisement, the Solution will detect the outcome that the floor created. There are a few different ways that the solution may to this. For sake of illustration, a generalized solution will be presented.

Assume that this example picks up from where the "Data Fetching & Price Floor Assignment" section ends. The current state is that the Ad Network has won the right to serve an ad impression at an $0.11 CPM which means that the Solution's floor price of $0.10 was exceeded. This is a favorable outcome. Assume that the Solution's measurement script could capture all Ad Network bids that were submitted to the Ad Platform. This would mean that the Solution Measurement script would create a data object capturing that the Ad Network bid was $0.11. Assume that the measurement script, via a flag, marker, markup comment, uniform reference locator (URL), or some other unique data point recognizes that the ad position on the content was filled by an ad from the Ad Network. This would confirm that the $0.11 CPM bid resulted in a "win" for the Ad Network. This information would be sent back to the Solution's server as explained in the "Data Collection" section. Since this specific combination of content and user parameters already exists in the Solution's database, the data would need to be updated rather than entered as new data. Since the result of the auction was that the floor was exceeded, it is assumed that the floor is too low. Therefore, the Solution's logic can increment the floor up by some amount. Assume the calculation is to add $0.01 whenever a win occurs. This results in the next bid prepared in the score file for this piece of content, being set to a value of $0.11. Conversely, if the floor was $0.10 and the Ad Network bid was $0.09 it would be assumed that the floor is too high and could be lowered by some amount such as -$0.01.

In some embodiments, bids submitted to the ad network may be captured by an ad network script that is running on the page. This may occur if, for example, the Solution's server and the other bidders transmit bids to the page's ad network script. This may also occur in situations where the Solution's server and other bidders transmit bids to the ad network, and the ad network transmits bidder codes and/or bid amounts to the ad network script to store that information in the page's header code or elsewhere on the page. In such situations, the measurement script does not necessarily need to monitor contents of the ad insertion field, but instead may monitor the data stored by the page's ad network script. When the data stored by the ad network script includes a bid having a value that is higher than the phantom bid, or if that stored data indicates that a bid other than the phantom bid won the ad placement, the measurement script may return this information to the solution so that the Solution's server knows that a higher bid won the ad placement.

Optionally, the measurement script may measure and return this information before the Ad Network returns an advertisement to the ad position on the page. The measurement script may capture this information during a particular interval of time after the page transmits a code to bidders that invites the bidders to bid on the ad insertion field, after triggering the code, or simultaneously with such code.

The descriptions above are examples. Other variations include: In a case where the Ad Network won the impression, the definition of a "win" can vary, therefore the Solution may also consider and/or not consider any or all of the following: (a) Other Ad Networks that bid and what position the floor price was in between the various bids; (b) Direct sold advertisements displaying instead of Ad Networks; (c) House or Added Value advertisements displaying instead of Ad Networks; Ad Platform outcome of the ad selection process; (d) Delta (difference) between winning price and floor price; and/or (e) Specific advertiser of the ad. The Solution's measurement script could capture and temporarily store not only all bids that happened during the current run of the Ad Stack but also other data attributes that are available within the page code. For instance, user audience data or publisher requested minimum floors.

The following will describe an embodiment of the solution. FIGS. 2-6B also illustrate a general flow of the process, which will be described in more detail below. Other embodiments are also within the scope of this disclosure. For purposes of the discussion below, assume the following: A website publisher operates example.com, which produces and publishes news content. The publisher monetizes digital ad positions across the content. The average CPM paid by the website's ad partners is $1.00. The publisher is interested in increasing the CPM in order to improve the yield of its ad inventory.

First, the Publisher would implement the solution's measurement script. This could be hardcoded onto the publisher's digital content page, such as in the HTML document's footer, a "tag manager" service, or any other common standard used to add external libraries to the pages of a website. The solution's server will respond to requests for the script with the Solution's measurement library.

Second, the Publisher would implement the solution's "request for data" script. In this case, the solution's measured data will be accessible via a publicly available data file hosted on the solution's server. Whenever a site visitor accesses any webpage associated with the example.com domain, a request will be sent to the solution's data store for the data file that matches the domain and path (page) of the request. This type of request is very much akin to what is known as a "header request" or a "header bidder request".

Third, the Publisher will create an order in its Ad Platform. This order will signal to the solution's measurement script if the floor price was appropriate. The setup of the order creates one "line item" for each price increment that the Publisher designates as a floor value. In this case, the first line item is set to $0.10, the second line item is set to $0.20, and so on up through $10.00. The line items will be set to a priority level within the Ad Server so that they only compete with the Ad Networks that the Publisher has set up. Generally, this strata of line items in an Ad Server is called "Price Priority" meaning that the Ad Server chooses a winning line item based on the set price. Within each of the line items, the Publisher needs to add a creative (advertisement) that will deliver every time the Solution line item wins. In this case, the Publisher will add an HTML comment instead of an advertisement, it says "Solution has won the impression." This comment will be delivered as an ad to the webpage whenever the Solution's floor price triggers the matching Solution line item with the highest Price Priority and therefore has won the right to serve the ad to the page. Note that the Solution, Ad Server and its Orders, Line Items, and Creatives are distinct, and the embodiment does not make claim over any of the workings of the Ad Server or its components. This set up is simply an example of how a floor value outcome can be perceived by the Measurement Script.

The implementation by the Publisher is now complete. Assume that the Solution is now released onto the publicly available version of the site and ordinary website visitors are now able to access the latest version of the website. This in turn triggers the Solution to operate.

Assume that example.com has published digital content—in this case a new article—at the web address: "http://www.example.com/breaking-story" which includes two ad positions.

Figure 2:
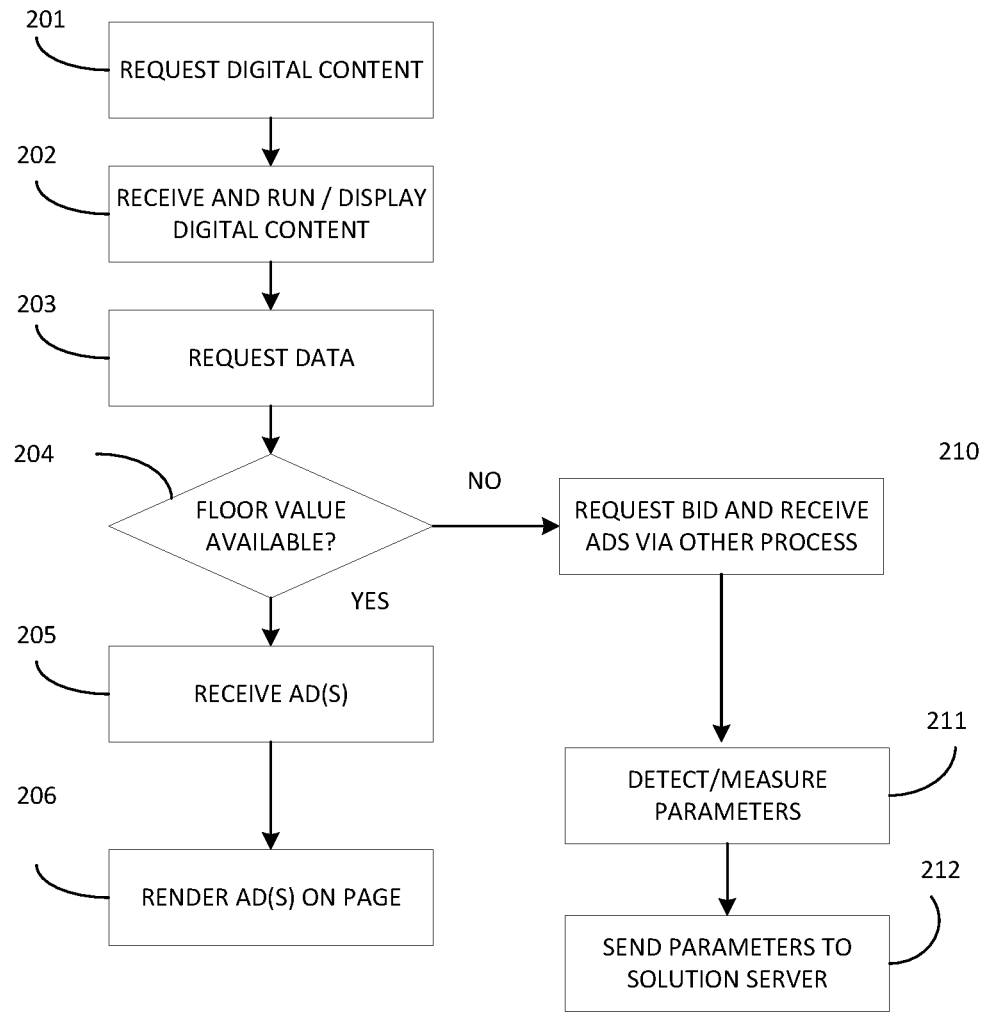
FIG. 2 illustrates an example real-time digital advertising method as implemented by an electronic device of a user who requests a webpage containing digital content.

With reference to the flow diagram of FIG. 2, which illustrates actions taken by an electronic device of a user who desires to view digital content and/or a publisher of the content, at 201 the user's electronic device requests the new article by pointing the browser to the web page address of the digital content. As the user's browser receives, runs and displays the digital content at 202, the browser will compile and execute the web page's code, including the solution's "request for data" script. When this happens, at 203 a network request will be made to the solution server to query for a score file that matches the URL structure of the requested content (i.e., www.example.com/breaking-story). If there have been no previous measurements of this content, the solution server returns nothing (204: NO) and the web page will request and return ads according without the solution's involvement at 210. However, as the page code continues to execute it will run the solution's measurement script at 213. The measurement script will capture any data points publicly available to it via the Device, Browser, or Document Object Model. For example, the measurement script may detect and store the following parameters:

Website Host: www.example.com
Website Page: /breaking-story
Device Operating System: Windows
Browser: Chrome version 50.1
Ad Position HTML ID 1: top-ad
Ad Position 1 size: 728×90
Ad Position HTML ID 2: bottom-ad
Ad Position 2 size: 300×250

At some point the web site visitor leaves the new article web page by closing the browser window or pointing the browser to a new address. This in turn triggers the browser's native user exit event commonly known as an "unload" event. The solution's measurement script detects this unload event which then triggers a network request. This network request sends the measurement script's recorded data (such as that above) to the solution's server at 212.

Figure 3:
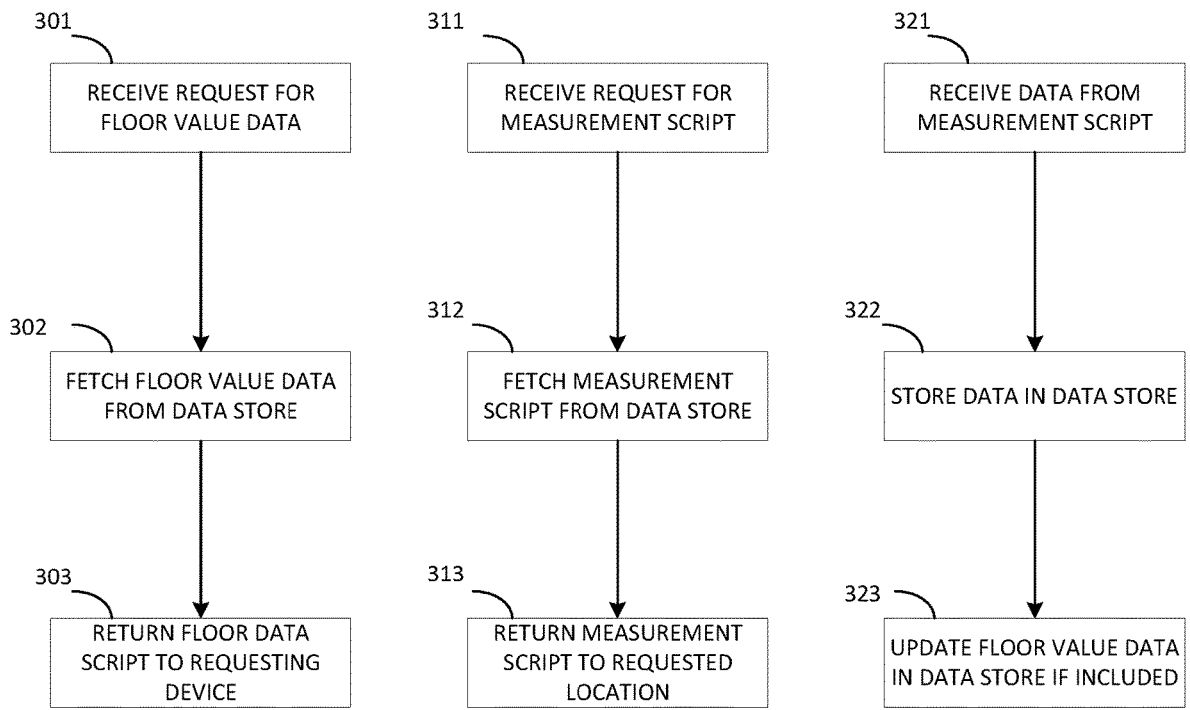
FIG. 3 illustrates example actions that a solution server may perform in various embodiments.

FIG. 3 illustrates actions that the solution server may take. In one aspect, the solution server may receive requests for measurement scripts (at 311) from a user device or a publisher. In response to such a request, the solution server will fetch a measurement script from a data store at 312 and return the measurement script to the requesting entity, or to a destination specified by the requesting entity, at 313.

At 321 the solution server will receive data that measurement scripts associated with various web pages send to the solution server (as they may do in step 212 of FIG. 2). The solution server parses the data sent to it by the measurement script, ignores data that is not of interest (such as, for example, the browser's version number) and at 322 stores it in a database that is part of or in communication with the solution server, in a data structure such as the example shown below:

| ID | Host | Path | Device | Browser | Ad ID | Ad Size | Floor Value | Events |
|---|---|---|---|---|---|---|---|---|
| 1 | www.example.com | /breaking-story | Windows | Chrome | top-ad | 728 × 90 | $0.10 | 1 |
| 2 | www.example.com | /breaking-story | Windows | Chrome | bottom-ad | 300 × 250 | $0.10 | 1 |

More web page visitors from varied Devices and Browsers engage with the new article in the same fashion. This results in the data such as the following in the solution server's database:

| ID | Host | Path | Device | Browser | Ad ID | Ad Size | Floor Value | Events |
|---|---|---|---|---|---|---|---|---|
| 1 | www.example.com | /breaking-story | Windows | Chrome | top-ad | 728 × 90 | $0.10 | 1 |
| 2 | www.example.com | /breaking-story | Windows | Chrome | bottom-ad | 300 × 250 | $0.10 | 1 |
| 3 | www.example.com | /breaking-story | Apple | Safari | top-ad | 728 × 90 | $0.10 | 1 |
| 4 | www.example.com | /breaking-story | Apple | Safari | bottom-ad | 300 × 250 | $0.10 | 1 |
| 5 | www.example.com | /breaking-story | Android | Chrome | top-ad | 320 × 50 | $0.10 | 1 |
| 6 | www.example.com | /breaking-story | Android | Chrome | bottom-ad | 300 × 250 | $0.10 | 1 |

As illustrated in FIG. 2, each time that a visitor interacts with the web page, at 203 a request is made to the solution server to check whether data exists that matches the visitor's parameters in order to pass a floor value back to the web page. In the example above, since each of these visitors was unique, no previous data was available.

However, assume that a subsequent visitor is using a Windows device and the Chrome browser. As the device loads the breaking story article in its browser, the page code initializes the solution's "request for data" script. At 203 request is made to the solution server for a data file with a floor value or values for the breaking story article. With reference to FIG. 3, when the solution server receives this request at 301, it will check a data store to see if a floor value exists for the digital content. If a floor value exists for the content, the solution server will fetch the floor value at 302 and return the floor value to the requesting device in a data object at 303. The data object may be, for example, a digital data file with the following structure (note, for illustration, it is deemed that browser data is not desired as a segmentation even though it is stored in the database):

```
                    Domain: www.example.com
                    Path: /breaking-story
                    Device: Windows
                        Ad ID 1: top-ad
                            Size: 728x90
                            Value: $0.10
                        Ad ID 2: bottom-ad
                            Size: 300x250
                            Value: $0.10
                    Device: Apple
                        Ad ID 1: top-ad
                            Size: 728x90
                            Value: $0.10
                        Ad ID 2: bottom-ad
                            Size: 300x250
                            Value: $0.10
                    Device: Android
                        Ad ID 1: top-ad
                            Size: 320x50
                            Value: $0.10
                        Ad ID 2: bottom-ad
                            Size: 300x250
                            Value: $0.10
```

At 302 the solution's data fetching script would look at the current site visitor's parameters and select the matching Windows>top-ad>728×90>$0.10 and Windows>bottom-ad>300×250>$0.10 as the two floor values to make publicly available to the page.

Next, with reference again to FIG. 2, when a floor value is available (204: YES), at 205 the solution's data fetching script receives a data object with the floor value. At 206 the Publisher's web page code would take these two variables and pass them to one or more ad networks in a request for bid. The request may be sent the Ad Platform with each ad position's ad request as a key value pair, such as "floor"="$0.10".

Figure 4:
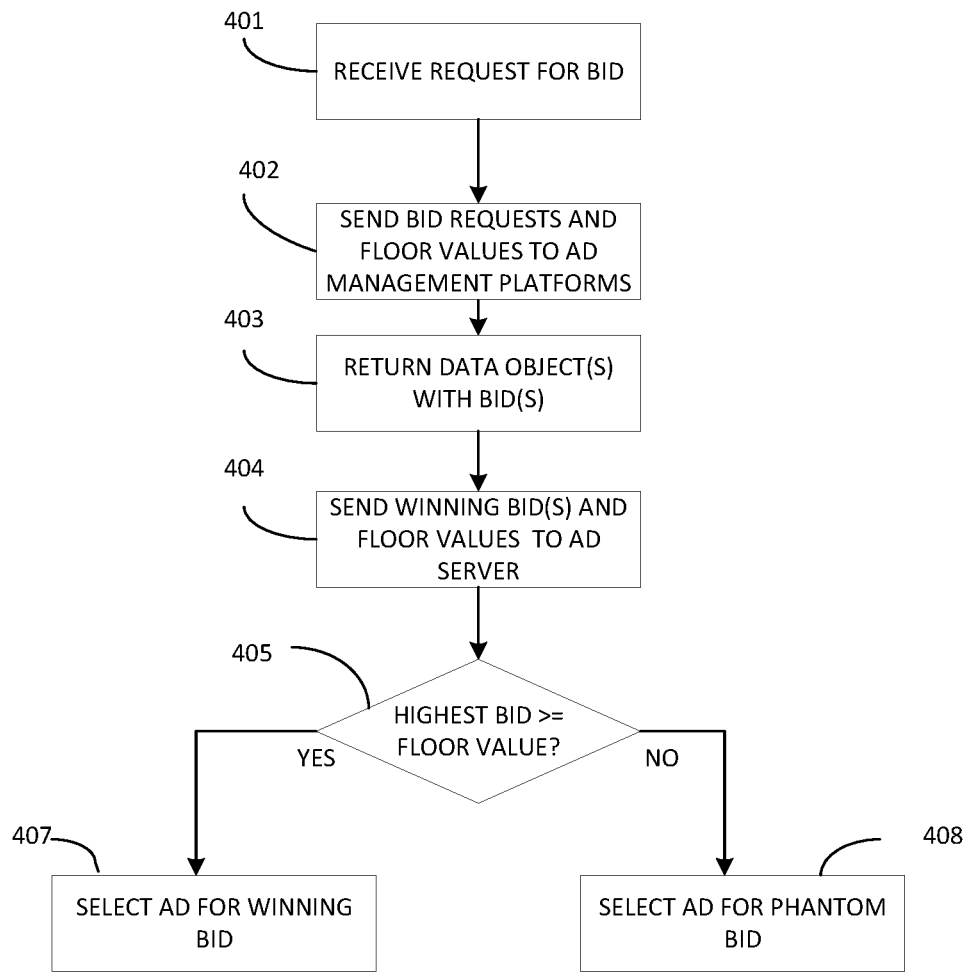
FIG. 4 illustrates example actions that an ad network and ad server may perform in various embodiments.

Referring to FIG. 4, when an Ad Network receives a bid request at 401, the Ad Network will then consider the floor value (in this example, $0.10) as a "phantom bid" during its auction process for each ad position. A phantom bid is a bid that is considered, and which may be a winning bid, but which is not received from the solution server and not in response to any invitation to participate in the auction. In an example run of this process, at 402 the Ad Network will invite bids, and at the Ad Network will receive and select a winning bid. In an example, for a "top-ad", the winning bid is from an Ad Network at $1.00. For the "bottom-ad", the highest Ad Network bid was $0.05, therefore the solution's $0.10 phantom bid is the highest bid. At 403 the Ad Network will return a data objects with the winning bids to the user device, which at 404 will then send an ad request to an ad server to return ads that meet the bid criteria. In the case of the "top-ad" in this example, the highest bid exceeded the floor value (405: YES), then at 407 the ad server selects an ad meeting the criteria of the winning bid, and returns that ad to the ad network to serve to the ad insertion field on the web page of the user device. However, if the highest bid does not meet or exceed the floor value (405: NO), then the solution wins the bid, as it did in this example for the "bottom-ad", and at 408 the Ad Platform will select the advertisement linked to the $0.10 line item associated with the solution. The Ad Platform returns the "top-ad" advertisement and the "bottom-ad" advertisement. The "advertisement" for the second ad position in this case may be an actual ad, or some placeholder such as an HTML, comment that says "Solution has won the impression".

Returning to FIG. 2, once the Ad Platform has finished placing advertisement code on the page and the web page visitor's browser received (step 205) has started to render the ad (step 206), the Solution's measurement script will execute as previously described at 211 and 212. However, this time, the Solution's measurement script will detect that one of the advertisements contains the HTML, comment that reads: "Solution has won the impression". Therefore, when the web page visitor is done with her/his session and the Solution's measurement script sends data back to the Solution's server, there will be a data attribute signaling that the value for "top-ad" was higher than the floor while the value for the "bottom-ad" was not higher than the floor as the floor price won the auction and ad selection process. The database may now look as such:

| ID | Host | Path | Device | Browser | Ad ID | Ad Size | Floor Value | Events |
|---|---|---|---|---|---|---|---|---|
| 1 | www.example.com | /breaking-story | Windows | Chrome | top-ad | 728x90 | $0.11 | 2 |
| 2 | www.example.com | /breaking-story | Windows | Chrome | bottom-ad | 300x250 | $0.09 | 2 |
| 3 | www.example.com | /breaking-story | Apple | Safari | top-ad | 728x90 | $0.10 | 1 |
| 4 | www.example.com | /breaking-story | Apple | Safari | bottom-ad | 300x250 | $0.10 | 1 |
| 5 | www.example.com | /breaking-story | Android | Chrome | top-ad | 320x50 | $0.10 | 1 |
| 6 | www.example.com | /breaking-story | Android | Chrome | bottom-ad | 300x250 | $0.10 | 1 |

Note that for row IDs 1 & 2 above, the Events column incremented up by one since a second site visitor matched this configuration. The "top-ad" floor value incremented to a higher value since the $0.10 floor was not high enough to win, and the "bottom-ad" floor value decremented to a lower value since $0.10 was high enough to win. Assuming that all future Ad Network bids are $1.00 for "top-ad" and $0.05 for "bottom-ad" it is expected that the system will continue to increase the "top-ad" floor while reducing the "bottom-ad" floor.

As additional visitors engage with the breaking story this data continues to be sent to the page, it is measured, updated, and ready for the next site visitor.

Optional Embodiments

The above example is one way to measure a web page visitor's parameters, send those parameters to the solution server for storage, provide the data back to the web page for future web page visits, and detect if the floor is too high or too low. However, this can be achieved in many different ways. Some optional features are listed below:

In some embodiments, the solution's specific set up might change for other types of content or media such as mobile applications, connected and or smart TV, augmented reality, metaverse, digital video, digital audio, and or digital outdoor billboards. However, generally all of these media connect to a marketplace in which digital auctions are run in real time before displaying an advertisement. These auctions run in the matter of milliseconds and occur billions of times a day. Additionally, ad networks and ad servers often handle multiple types of content or media. For example, Google's "Google Ad Manager" is the industry's most used Ad Platform and can act as an ad server and as an ad network for websites, digital video, digital audio, and digital mobile applications at the same time. In fact, most large digital publishers use Google Ad Manager for all of their varied digital inventory. The solution could therefore be integrated with all of a digital publisher's varying content and media while communicating with the ad server to submit optimal floor prices, regardless of integration specifics.

In some embodiments, the Solution may be agnostic of type of currency.

The most commonly used pricing model in digital advertising is the CPM. However, any pricing model could be substituted or done in parallel such as vCPM, eCPM, CPC, RPM to name a few.

In some embodiments, the measurement script may be accessed via a network call, served locally by the website, or hard coded into the web page code.

In some embodiments, the Solution may align data against client IDs, network IDs, and/or something other than domain and page URLs.

The solution may or may not be integrated into the Ad Platform. If not, the floor value can be compared to the value of winning advertisements by capturing the value from the page code itself. (Most Ad Networks expose bids to the page code for ingestion by the Ad Network; this is known as "header bidding".) The Ad Platform could be configured to pass winning bid amounts to the web page with the delivery of the Ad Code, the solution could capture the winning Order, Line Item, or Creative (advertisement) IDs as assigned by the Ad Platform and use the Ad Platform's API to look up the price values associated to them, and or the value of the advertisements could be assumed to be a flat rate assigned by the solution's user.

The solution, when integrated into the Ad Server as an advertisement, may use an HTML comment to signal when the solution's "phantom bid" has won the Ad Server's ad selection process. However, it could also be a script, variable, flag, or otherwise available method of communication between the Measurement Script and page code. Additionally, the Ad Server could select a specific advertisement, collection of advertisements, or no advertisement which could be set up as the conditions for the Measurement Script to declare as a floor value win/loss state.

In various embodiments, websites using the solution could have one or many ad positions auctioned to one or many Ad Platforms and Ad Networks.

When the solution makes a request for data, the response optionally may be in the form of a score file. However, the data could also be directly fetched from a database, data store, cache or any other feasible data storage location.

If there have been no previous measurements, the solution may respond in step 204 with a default dataset rather than nothing.

The Measurement Script can capture parameters such as Host, Path, Device, Browser, Ad ID, and Ad Size as web page visitor parameters. Further, the Measurement Script, through common engineering practices, may access additional data publicly (or in engineering terms as it relates to the current user session data this is considered "globally" available) such as information about the current document, browser, HTML cookies, browser local storage, web page code variables, viewport dimensions, device connection speed, device operating system, or device processor. Additionally, the user of the Solution may inject into the Solution's measurement custom parameters such as first party audience IDs, third-party audience IDs, Content Template ID, Logged In User Flag, and or any data that further segments individual user experiences.

The solution may temporarily store measurements or immediately return them to the solution's server.

During a user session, the Solution may detect information all at once or over time.

The solution may store or send the measurements to the solution's server in a structured or unstructured format.

The solution may wait for an "unload" event and or other user generated events and or send data to the solution's server at regular or irregular intervals.

The data structure of the stored data may vary by the level of granularity created by the depth of segmentation.

Floor values exist as the lowest child element in the data array or structure in the example. However, floor values could be derived for the top level (a "www.example.com") floor or any other data point in the hierarchy.

The floor value may be requested more than once during a page visitor session, (for instance, if the ad positions "refresh") and make all new ad requests periodically.

The Ad Platform may ingest the solution data as key value pairs or any other method or format that the Ad Platform typically uses to ingest page level data. Additionally, the Ad Platform may instead make a direct request to the solution's server (via API or other suitable method) and request data directly rather than needing the page level code to pass in the Solution's data.

The Ad Server may have varying logic to handle floor values. Therefore, the floor value communicated to the Ad Server may be expressed as commands, alphanumeric characters, macros, or a specific method as determined by the Ad Server to produce the desired effect of creating a price comparison.

The data stores used with the solution may store each recorded data point individually or in aggregate. The data stores may store data points for a set or infinite amount of time.

The floor value increments may increment by any value (such as one United States cent) up or down as needed. For example, as a percentage, multiple price increments up or down, fractions of a price up or down, and/or average price calculations could be used.

Machine learning or artificial intelligence may be trained on the Solution data to predetermine optimal starting floor values and or floor value adjustments.

Rather than associating each ad position by its web address, as a way to organize the data, each ad position could be given a unique name or hash.

The key value pair name used to hand data off between the Solution and web page code or other web page applications, does not have to be called "floor."

The method of implementation describes a measurement script and a request for data script as two separate entities for illustration purposes. However, both could be combined into one entity (e.g., a library) which fetches and measures.

The example used for purposes of illustration above describes floors being incremented up or down in value. However, the result of the increment may be rounded to whole numbers to align with the example of $0.10 incrementing line items matching the Solution's bids. In another example, the line items could be set up with one cent incrementing line items rather than ten cent increments. Additionally, the line items could be a mix of increments such as one cent between $0.01 and $1.00, ten cents between $1.00 and $10.00, and $1.00 between $10.00 and $100.00.

Figure 5:
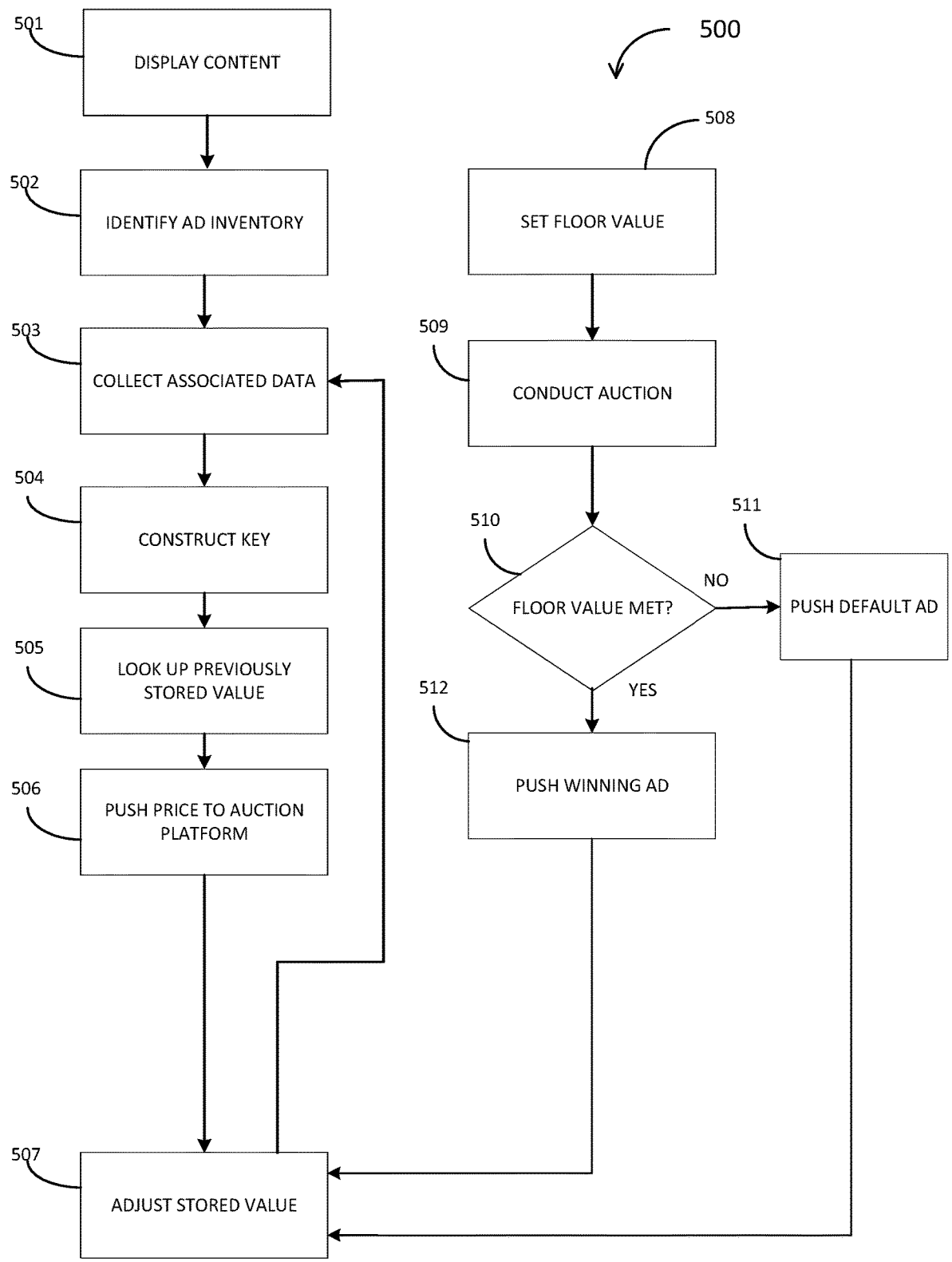
FIG. 5 is a cross-functional flowchart illustrating various aspects of the solution's process.

FIG. 5 illustrates an example cross-functional flowchart 500 for a method of real-time auctioning of digital advertising. In some examples, the method is executed by software (e.g., one or more scripts, such as a measurement script) executing within a user interface of an electronic device which is displaying content to an observer. The method (and script) may also be executed in whole or in part on a remote server capable of accessing the user interface. At step 501, the method includes providing content to an observer. The content may be published on a web page, such as a blog, or news source, or other source of compelling content. In some examples, the content includes a game or other form of entertainment. The content may be displayed on a client electronic device, such as a tablet or game console, or it may be displayed on a public electronic device, such as a sign or billboard on the side of a road, at a train station or airport, etc. The user interface may include opportunities for providing additional content, such as digital advertising.

At step 502, the method includes identifying one or more available advertising opportunities within the content displayed to the observer. These opportunities, also known as ad inventory, may include ad insertion fields, i.e., locations on the web page or portions of the game screen or other location associated with the content where a digital advertisement may be added to the other digital content. In some examples, inventory also includes audible advertisements. In each example, each potential advertisement opportunity may be inventoried in terms of salient characteristics of the opportunity, such as size, type, or location on a web page, etc. The characteristics may be characteristics of interest to a potential source of additional content, such as an online supplier of digital advertising (e.g., an Ad Network). In various embodiments, identification of the ad insertion field may be performed by a measurement script that is running on the page, and the measurement script may transmit this information to a solution server.

At step 503, the method includes collecting, from the content publisher and/or the device that is displaying the content, additional information associated with the advertising opportunity. The additional information may include information not normally transmitted to a potential source of additional content, such as an Ad Network. Examples of additional information may include the webpage address, the device and device operating system that the content observer is using, the application (e.g., web browser) used by the content observer, geolocation of the content observer (e.g., site visitor), browser history, keywords associated with the content, semantic data about the content, demographic information related to the target audience of the content, viewability of the ad opportunity, time of day, day of the week, weather observations associated with the content observer's location, or any other information which is generally available and practical to acquire. The information may be available from the content provider (publisher), the provider's vendors, or via an API from a web browser or other application used by the content observer, or from the client device (e.g., via a wired or wireless communication interface such as Bluetooth, IrDA, or NFC). In various embodiments, this information also may be collected by the measurement script that is running on the page, and the measurement script may transmit this information to a solution server.

At step 504, some or all of the associated data is used to construct or define a key representing a discrete category of advertising whose value is tracked. For example, the key may include the day of the week and the average daily temperature of the content observer's location (e.g., sorted into bins of +/−10 degrees Fahrenheit) on the day the observer accesses the content. Because the key includes the day of the week and average daily outdoor temperature, the value of advertising is separately tracked at this level of granularity, i.e., separately for each day of the week and separately for each bin of average daily temperature. The content provider may set the granularity of the key at an appropriate level, based, e.g., on knowledge of the particular content provided. The key may also include the location and size of the advertising opportunity and/or other information generally provided to potential sources of additional content.

At step 505, the key is used to look up a previously stored value for a piece of inventory (advertising opportunity) in the discrete category. As described in more detail below, the value could have been determined during a previous auction of an advertising opportunity under similar circumstances, within the same category as defined by the key (e.g., the same day of the week and same daily average temperature). In some examples, the value is maintained in a low-latency data store, to facilitate rapid lookup, modification, store, or for other operations. The low-latency data store may be partially or fully memory-resident. If no previous value exists, the method may set a default value for the piece of inventory by an appropriate means, such as a related value, or an average of related values (e.g., average of values from every day of the week and/or every daily average outdoor temperature). In some examples, the method simply assigns a default value, which may be predetermined or randomly selected or based on similar discrete categories.

At step 506, the value is pushed (or otherwise provided) to an auction platform, to be used in a real-time online auction. The auction platform may use the value as an auction "floor price", which is a minimum bid that the auction platform will accept for an ad inventory element. In some examples, the auction platform includes software executing on one or more servers operated by the content provider (e.g., a solution server). The auction platform may include the content provider's Advertising Platform. The value also may be pushed to the solution server.

In some examples, the content provider or another entity operates an Ad Platform (also referred to in this document as an ad network or an auction platform) capable of conducting online auctions of advertisement opportunities. As noted previously, the page being displayed (i.e., the digital content returned from the digital content network) may include code such as an ad network script that, when an ad insertion field is displayed or about to be displayed in the page, sends to one or more potential bidders an invitation to bid for the placement of an advertisement in the ad insertion field. The bidders may then submit their bids directly to the ad platform in some embodiments. In other embodiments, the bidders submit their bids to the ad network script that is running on the page, which relays the bids to the ad network. This process is further illustrated in FIGS. 6A and 6B.

Through the online auction, the ad network may receive bids from multiple sources of online advertisement. In some examples, the multiple sources compete against each other for the opportunity to provide digital advertising or other content. In some examples, the sources of online advertisement base their bids on information such as the size, position, and/or viewability of the advertisement opportunity. However, the content provider may track inventory value in real-time and at a finer level of granularity than the sources of online advertisement choose to or are capable of. Furthermore, auction formats, including second-price auctions, may impose structural limitations on the ability of the Ad Platform to determine the highest price that external sources of online advertisement are willing to pay for each advertising opportunity.

To address these and other limitations, the solution server may provide a "phantom bid" to the Ad Platform. In some examples, the "phantom bid" is configured so that if the "phantom bid" wins the auction, it can be recognized, e.g., by a measurement script executing in a web browser. For example, the "phantom bid" may be associated with recognizable content, such as specific HTML code, or a specific image, so that if the phantom bid wins the auction, the Ad Platform displays the recognizable content in the advertising opportunity, e.g. allowing the measurement script to recognize the displayed content. In other embodiments, as noted above, the measurement script may simply monitor bid data passed through the ad network script and return this data to the solution server so that the solution server knows whether or not its bid had the highest value and thus won the ad placement. In some examples, the Ad Platform and/or the external sources of online advertisement are configurable to include an auction "floor," or minimum acceptable bid price. The content provider may configure the Ad Platform and/or the external sources of online advertisement to use the "phantom bid" as the floor.

At step 508, the auction platform may establish a floor, or lowest acceptable bid, for the online auction, based on the tracked value of the piece of inventory pushed to the auction platform at step 506. In some examples, the auction platform provides the floor to the sources of online advertisement, e.g., if the sources provide a suitable mechanism for doing so. Otherwise, the lowest acceptable bid if impliedly established by submitting the "phantom bid" to compete with bids from external sources of online advertisement. At step 509, the auction platform conducts the auction for the piece of inventory. If an external bid (i.e., a bid other than the phantom bid) is received which meets the floor value, the winning ad is displayed, e.g., on the web page in the ad insertion field (or otherwise made detectable to the measurement script). For example, Ad Platform may display the winning ad on a web page that includes the auctioned advertising opportunity, allowing the measurement script to detect that the ad is displayed on the web page. In some situations, if no acceptable bid is received (i.e., no bid that meets the established floor), then the "phantom bid" may win as a default. In this case, the auction platform may push (or otherwise provide) a default ad, such as a house ad, to display (and be recognized by the measurement script). In some examples, the auction platform may push or display a "dummy" ad, e.g., code, such as JavaScript or HTML, which indicates to the measurement script that no acceptable bid was received.

At step 507, the solution server adjusts the tracked value (i.e., the floor price) of the inventory. In some examples, the measurement script or the solution server uses the key that was constructed at step 404 to access the tracked value. If no winning bid was received from external sources, the value may be reduced (e.g., by a fixed amount). If the winning bid from an external source is equal to the tracked value, the value may be increased (e.g., by a fixed amount). If the winning bid is greater than the tracked value (i.e., greater than the existing floor), the value may be increased to equal the value of the winning bid, or the value may be adjusted upward by a gain factor multiplied by the difference between the tracked value and the winning bid. The tracked value may be stored in the low-latency data store using the same key that was used to retrieve the value in step 505. In this way, the low-latency data store may be configured to support simultaneous tracking values associated with multiple discrete categories and multiple real-time auctions. In some examples, the low-latency data store supports real-time auctions for all ad insertion fields for a web page (or other, similar content) without unduly reducing the time to display the web page (e.g., in less than 200 milliseconds).

If no winning bid was received from an external source, the solution server or another component of the system may adjust the floor to a price at, or which is a determined amount below (such as 5% below or 10% below) the amount of the phantom bid, and then re-auctioning the unsold piece of inventory with the new floor one or more times in a further attempt to monetize the inventory. Alternatively, the auction platform may choose to display a default or "house" ad to signal to the sources of online advertisement that they should raise their bids during subsequent auctions. Thus, the floor may be used to facilitate tracking or predicting the value of advertising opportunities at a fine level of granularity, and/or may be used to encourage higher bids for available inventory.

Figure 6:
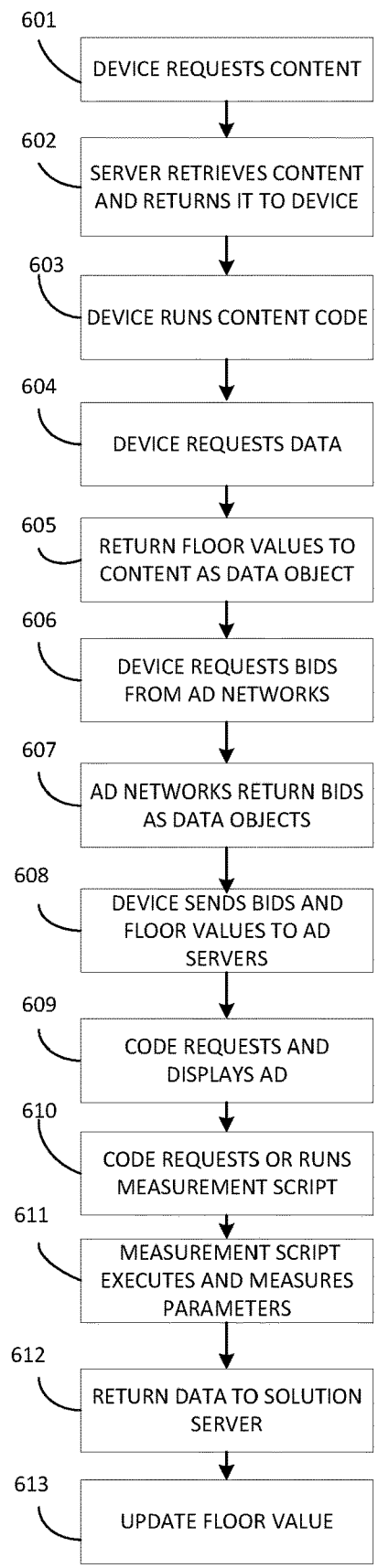
FIG. 6 illustrates an integrated flowchart showing actions by multiple participants in the processes described in this document.

After the tracked price is adjusted for the particular piece of inventory, the method repeats for each piece of inventory. The method provides for auctioning all available inventory, e.g., during the time that a web page is displayed. Thus, the method implements a real-time auction of advertising inventory tracked within discrete categorizations which are configurable by content providers. The method implements multiple, parallel, tracking feedback loops at the configured level of granularity and within a variety of auction formats. Auction formats such as second-price auctions may obscure the true value of the inventory. In these circumstances, winners only need to outbid competitors, rather than offer the highest price they are willing to pay. By dynamically adjusting a "phantom bid" (e.g., implemented as an auction floor) in real time during the auction process, bidders are forced to bid the actual value of the inventory or risk losing the auction to a rival (or to the phantom bid). Thus, the value of the inventory is more accurately measured. By maintaining a fine level of granularity (e.g., based on discrete categorizations configured by the content provider, rather than broad categorizations typically used by the sources of advertising), the overall revenue generated by the inventory may be improved. Particularly valuable (or particularly low-value) inventory is not aggregated with average inventory. Higher prices can be demanded for high-valuable inventory, and low-value inventory can be filled with "house ads" to avoid dragging down the price of general inventory. And by re-auctioning unsold inventory (e.g., within the time to load the web page), the feedback loops can continue to track the value of inventory without perturbation, while simultaneously monetizing available inventory. Furthermore, the method may be used in conjunction with a variety of sources of advertising, including sources which accept floor information and those that do not accept floor information. The method may provide the sources of advertising with the information related to the discrete categorization of inventory, or it may withhold the information FIG. 6 illustrates an additional process flow in which various elements of the previous flow diagrams above are integrated together. At 601 a user electronic device sends a request for content to a digital content server. At 602 the content server retrieves the content and returns it to the device. At 603 the device uses a browser or other content rendering application to run the content code and display the content on a display of the device. At 604, when the code of the digital content is run by the device, the solution's request for data code will run. This will send a request for a floor value to the solution server. If no floor value exists for the content, then the solution server may return nothing, or it may return a default value. If a floor value exists, then at 605 the solution server will return a floor value or values to the device as a data object.

To receive and present an ad in an ad insertion field of the displayed page, the digital content's code (such as HTML) will then request bids from one or more ad networks at 606. The code may pass the floor values to the ad networks with the bids. At 607 the ad network or networks will return one or more bids to the content as a publicly viewable data object. At 608 the content code will send the bids and floor values to one or more ad management platforms (i.e., ad servers) with a request to return an ad. At 609, when an ad is returned and rendered in the ad insertion field at 610, the code from the digital content will run or request the solution's measurement script. At 611 the measurement script executes and measures various parameters of the device's interaction with the ad and/or content, as described above. At 612 the measurement script will send this data to the solution's server, which may compere the floor value to the bid value and update the floor value if appropriate at 613. If the bid value is higher than the floor value, the solution's server may update the floor value of the content to match the bid value. If the bid value is lower than the floor value, the solution's server may not change the floor value of the content, or it may lower the floor value to match the bid value or some other value that is less than its current value.

Figure 7:
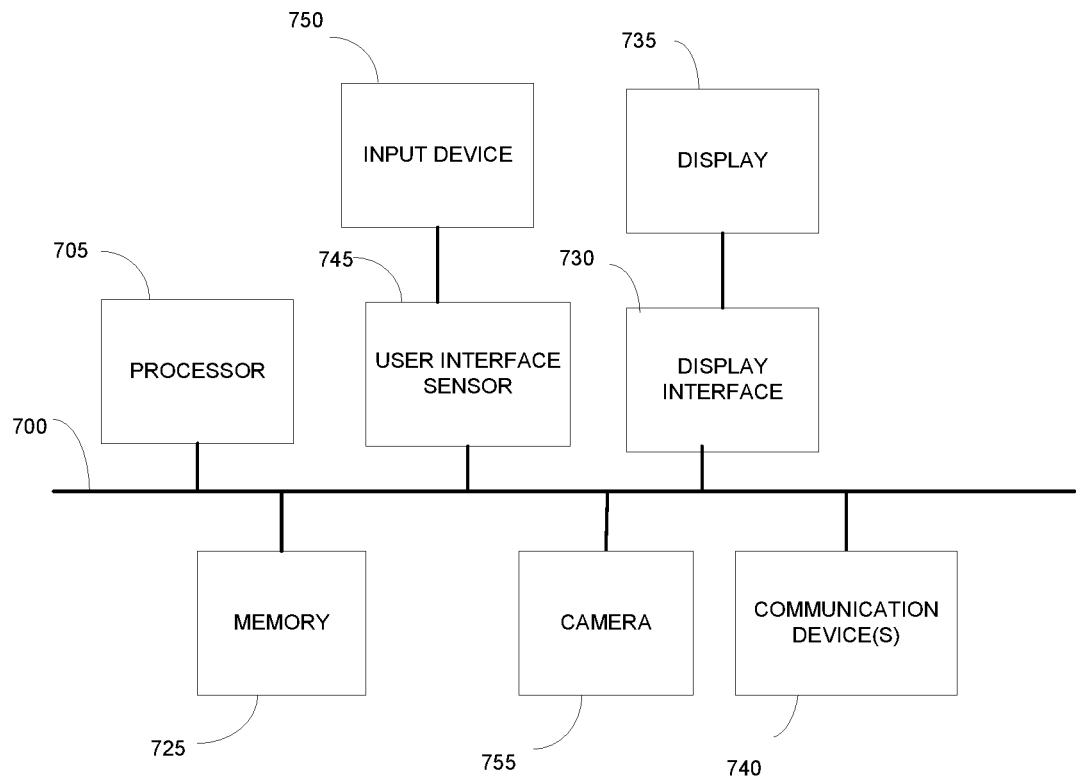
FIG. 7 illustrates example hardware components that an electronic device, such as a server, user device or other computing device of this disclosure, may include.

FIG. 7 depicts an example of internal hardware that may be included in any of the electronic components of the system, such as the user's client electronic device or any of the servers in the system. An electrical bus 700 serves as an information highway interconnecting the other illustrated components of the hardware. Processor 705 is a central processing device of the system, configured to perform calculations and logic operations required to execute programming instructions. As used in this document and in the claims, the terms "processor" and "processing device" may refer to a single processor or any number of processors in a set of processors, whether a central processing unit (CPU) or a graphics processing unit (GPU) or a combination of the two. Read only memory (ROM), random access memory (RAM), flash memory, hard drives and other devices capable of storing electronic data constitute examples of memory devices 725. A memory device 725 may include a single device or a collection of devices across which data and/or instructions are stored. Data transfer to and from a memory device may be managed by a controller.

An optional display interface 730 may permit information from the bus 700 to be displayed on a display device 735 in visual format such as a graphic and/or alphanumeric format. An audio interface and audio output (such as a speaker) also may be provided. Communication with external devices may occur using various communication devices 740 such as a wireless antenna, a radio frequency identification (RFID) tag and/or short-range or near-field communication transceiver, each of which may optionally communicatively connect with other components of the device via one or more communication ports. A communication device 740 may be communicatively connected to a communications network, such as the Internet, a local area network or a cellular telephone data network.

The hardware may also include a user interface sensor 745 that allows for receipt of data from input devices 750 such as a keyboard, a mouse, a joystick, a touchscreen, a touch pad, a remote control, a pointing device and/or microphone. Digital image frames also may be received from a camera 755 that can capture video and/or still images.

In this document, the terms "electronic device" and "computing device" refer to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. Electronic devices also may include components of vehicles such as dashboard entertainment and navigation systems, as well as on-board vehicle diagnostic and operation systems. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity. Additional elements that may be included in electronic devices are discussed above in the context of FIG. 7.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices. The network may include or is configured to include any now or hereafter known communication networks such as, without limitation, a BLUETOOTH® communication network, a Z-Wave® communication network, a wireless fidelity (Wi-Fi) communication network, a ZigBee communication network, a HomePlug communication network, a Power-line Communication (PLC) communication network, a message queue telemetry transport (MATT) communication network, a MTConnect communication network, a cellular network a constrained application protocol (CoAP) communication network, a representative state transfer application protocol interface (REST API) communication network, an extensible messaging and presence protocol (XMPP) communication network, a cellular communications network, any similar communication networks, or any combination thereof for sending and receiving data. As such, network 204 may be configured to implement wireless or wired communication through cellular networks, WiFi, BlueTooth, Zigbee, RFID, BlueTooth low energy, NFC, IEEE 802.11, IEEE 802.15, IEEE 802.16, Z-Wave, Home Plug, global system for mobile (GSM), general packet radio service (GPRS), enhanced data rates for GSM evolution (EDGE), code division multiple access (CDMA), universal mobile telecommunications system (UMTS), long-term evolution (LTE), LTE-advanced (LTE-A), MQTT, MTConnect, CoAP, REST API, XMPP, or another suitable wired and/or wireless communication method. The network may include one or more switches and/or routers, including wireless routers that connect the wireless communication channels with other wired networks (e.g., the Internet). The data communicated in the network may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, MTConnect protocol, or any other protocol.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method of automatically determining an auction floor for an ad insertion field of a user interface that presents digital content, the method comprising:
   by a processor while an electronic device displays a page comprising digital content, wherein the page includes an ad insertion field and a measurement script:
      receiving an indication that the electronic device is displaying the page and the ad insertion field;
      identifying an auction floor value that is associated with the ad insertion field;
      using the auction floor value to generate and submit to an advertising platform a phantom bid to insert content into the ad insertion field, wherein the phantom bid includes a tag that identifies the phantom bid as the phantom bid;
      after an advertisement has been displayed in the ad insertion field, receiving, from the measurement script, a data attribute for the ad insertion field, wherein the data attribute indicates whether the advertisement being displayed in the ad insertion field includes the content from the phantom bid; and
      if the advertisement being displayed includes the content from the phantom bid, generating a signal to adjust the auction floor value downward, otherwise not generating the signal to adjust the auction floor value downward.

2. The method of claim 1 further comprising, in response to the advertisement being displayed not including the content from the phantom bid, generating a signal to adjust the auction floor value upward.

3. The method of claim 1 further comprising:
   before identifying the auction floor value, receiving, from the measurement script, parameters associated with the electronic device or a user of the electronic device, wherein the parameters comprise a plurality of the following: page host, page identifier, uniform reference locator of the page, device operating system, browser, position of the ad insertion field on the page, or size of the ad insertion field; and
   wherein identifying the auction floor value comprises:
      querying a data store to return a floor value that is associated with the received parameters, and
      using the floor value that is returned from the data store as the auction floor value.

4. The method of claim 1 further comprising, by a processor that executes the measurement script:
   sending the auction floor value to the advertising platform along with an invitation to bid on the ad insertion field;
   receiving the advertisement from the advertising platform in response to the invitation to bid; and
   causing the ad insertion field to display the advertisement.

5. The method of claim 1, wherein the measurement script is embedded in a footer of the page, embedded in a header of the page, or associated with a tag on the page that calls the measurement script when the ad insertion field is being displayed.

6. The method of claim 1 further comprising, by the processor:
- sending the auction floor value to the advertising platform along with an invitation to bid on the ad insertion field;
- receiving the advertisement from the advertising platform in response to the invitation to bid; and
- causing the ad insertion field to display the advertisement.

7. A method of automatically determining an auction floor for an ad insertion field of a user interface that presents digital content, the method comprising:
- by a processor while an electronic device displays a page comprising digital content, wherein the page includes an ad insertion field:
  - receiving an indication that the electronic device is displaying the page and the ad insertion field;
  - identifying an auction floor value that is associated with the ad insertion field;
  - using the auction floor value to generate and submit to an advertising platform a phantom bid to insert content into the ad insertion field, wherein the phantom bid includes a tag that identifies the phantom bid as the phantom bid;
  - after an advertisement has been displayed in the ad insertion field, executing a measurement script that examines the ad insertion field and a data attribute for the ad insertion field, wherein the data attribute indicates whether the advertisement being displayed in the ad insertion field includes the content from the phantom bid; and
  - if the advertisement being displayed includes the content from the phantom bid, generating a signal to adjust the auction floor value downward, otherwise not generating the signal to adjust the auction floor value downward.

8. The method of claim 7 further comprising, in response to the advertisement being displayed not including the content from the phantom bid, generating a signal to adjust the auction floor value upward.

9. The method of claim 7 wherein identifying the auction floor value comprises:
- querying a data store to return a floor value that is associated with an identifier of the page; and
- using the floor value that is returned from the data store as the auction floor value.

10. A computer program product for automatically determining an auction floor for an ad insertion field of a user interface that presents digital content, the computer program product comprising:
- a memory; and
- programming instructions that are configured to cause a processor to, while an electronic device displays a page comprising digital content, an ad insertion field and a measurement script:
  - in response to receiving an indication that the electronic device is displaying the page and the ad insertion field, identify an auction floor value that is associated with the ad insertion field,
  - use the auction floor value to generate and submit to an advertising platform a phantom bid to insert content into the ad insertion field, wherein the phantom bid includes a tag that identifies the phantom bid as the phantom bid, and
  - after an advertisement has been displayed in the ad insertion field, upon receiving, from the measurement script, a data attribute for the ad insertion field, wherein the data attribute indicates whether the advertisement being displayed in the ad insertion field includes the content from the phantom bid:
    - generating a signal to adjust the auction floor value downward when the advertisement being displayed includes the content from the phantom bid, otherwise not generating the signal to adjust the auction floor value downward.

11. The computer program product of claim 10, further comprising programming instructions to, when the advertisement being displayed does not include the content from the phantom bid, generate a signal to adjust the auction floor value upward.

12. The computer program product of claim 10, wherein the programming instructions to identify the auction floor value comprise instructions to, in response to receiving, from the measurement script, parameters associated with the electronic device or a user of the electronic device, wherein the parameters comprise a plurality of the following: page host, page identifier, uniform reference locator of the page, device operating system, browser, position of the ad insertion field on the page, or size of the ad insertion field:
- query a data store to return a floor value that is associated with the received parameters; and
- use the floor value that is returned from the data store as the auction floor value.

13. The computer program product of claim 10, further comprising programming instructions to cause a processor that executes the measurement script to:
- send the auction floor value to the advertising platform along with an invitation to bid on the ad insertion field; and
- upon receiving the advertisement from the advertising platform in response to the invitation to bid, cause the ad insertion field to display the advertisement.

14. A computer program product for automatically determining an auction floor for an ad insertion field of a user interface that presents digital content, the computer program product comprising:
- a memory; and
- programming instructions that are configured to cause a processor to, while an electronic device displays a page comprising digital content and an ad insertion field:
  - in response to receiving an indication that the electronic device is displaying the page and the ad insertion field, identify an auction floor value that is associated with the ad insertion field,
  - use the auction floor value to generate and submit to an advertising platform a phantom bid to insert content into the ad insertion field, wherein the phantom bid includes a tag that identifies the phantom bid as the phantom bid,
  - after an advertisement has been displayed in the ad insertion field, execute a measurement script that examines the ad insertion field and a data attribute for the ad insertion field, wherein the data attribute indicates whether the advertisement being displayed in the ad insertion field includes the content from the phantom bid, and
  - if the advertisement being displayed includes the content from the phantom bid, generate a signal to adjust the auction floor value downward, otherwise not generate the signal to adjust the auction floor value downward.

15. The computer program product of claim 14, further comprising programming instructions to, when the advertisement being displayed does not include the content from the phantom bid, generate a signal to adjust the auction floor value upward.

16. The computer program product of claim 14, wherein the instructions to identify the auction floor value comprise instructions to:
   query a data store to return a floor value that is associated with an identifier of the page; and
   use the floor value that is returned from the data store as the auction floor value.

17. The computer program product of claim 14, further comprising programming instructions to:
   send the auction floor value to the advertising platform along with an invitation to bid on the ad insertion field; and
   in response to receiving the advertisement from the advertising platform in response to the invitation to bid, cause the ad insertion field to display the advertisement.

18. A method of automatically determining an auction floor for an ad insertion field of a user interface that presents digital content, the method comprising:
   by a solution server processor, while an electronic device is displaying digital content having an ad insertion field, executing instructions to:
      determine a category associated with the ad insertion field;
      receive, from a data store, a previously determined floor value associated with the category;
      use the floor value to generate and submit a phantom bid to a real-time auction of the ad insertion field among a plurality of external sources of content, causing one or more of the external sources of content to issue a bid;
      receive, from a measurement script that is running on a page that is displaying the ad insertion field, information about a winning bid for the ad insertion field;
      using the information about the winning bid to determine whether the phantom bid is the winning bid; and
      if the phantom bid is the winning bid, generating a signal to adjust the floor value downward, otherwise not generating the signal to adjust the floor value downward.

19. The method of claim 18 further comprising, by a processor that is executing the measurement script:
   monitoring bid data that is captured by an ad network script that is running on the page, wherein the bid data corresponds to the phantom bid and a plurality of additional bids; and
   extracting the information about the winning bid for the ad insertion field from the bid data.

* * * * *